United States Patent [19]

Ortega

[11] 4,368,896
[45] Jan. 18, 1983

[54] HAND TROLLEY

[76] Inventor: Victoriano M. Ortega, Calle Palencia No. 25, Madrid-20, Spain

[21] Appl. No.: 200,337

[22] Filed: Oct. 24, 1980

[51] Int. Cl.³ .............................................. B62B 5/02
[52] U.S. Cl. ................................... 280/5.24; 280/47.2
[58] Field of Search ................ 280/47.2, 47.27, 47.28, 280/5.2, 5.24, 47.24

[56] References Cited

U.S. PATENT DOCUMENTS

| | | | |
|---|---|---|---|
| 2,772,096 | 11/1956 | Hanson | 280/5.24 |
| 3,052,323 | 9/1962 | Hopfeld | 280/5.2 X |
| 4,247,125 | 1/1981 | Rayment | 280/5.24 |

FOREIGN PATENT DOCUMENTS

| | | | |
|---|---|---|---|
| 188 | 4/1979 | Fed. Rep. of Germany | 280/5.24 |
| 90425 | 11/1957 | Norway | 280/47.2 |

Primary Examiner—Joseph F. Peters, Jr.
Assistant Examiner—Michael Mar
Attorney, Agent, or Firm—Wenderoth, Lind & Ponack

[57] ABSTRACT

A trolley 10 for negotiating stairs with three overlapping pairs of wheels 11, 18, 19 the tangential plane 20 of which is fixed acute angle of about 30° to the back 13 of the frame 12. In normal use the wheels 18, 19 are off the ground so that trolley 10 can be easily maneuvered on front wheels 11.

3 Claims, 6 Drawing Figures

HAND TROLLEY

BACKGROUND OF THE INVENTION

1. Field of the Invention
   This invention relates to hand trolleys.
2. Description of the Prior Art
   A known hand trolley comprises a single pair of mutually co-axial ground-engaging wheels and a frame to which the wheels are mounted. The frame comprises a back part extending upwardly from the wheels to handles at the top thereof and a bottom part extending forwardly of the wheels. This trolley is easily manoeuverable on flat or slightly sloping ground, but is difficult to make to ascend and descend stairs.

SUMMARY

According to the invention there is provided a hand trolley comprising a pair of mutually co-axial ground-engaging wheels and a frame to which the wheels are mounted, the frame comprising a part extending upwardly from the wheels to a handle at the top thereof and a part extending forwardly of said wheels, characterised by at least one pair of mutually co-axial auxiliary wheels mounted to the frame behind the first-mentioned pair of wheels in such a manner that a plane, which is tangential to the first-mentioned pair of wheels and also tangential to the or each pair of auxiliary wheels, the plane being on the far side of the axes of the auxiliary wheels from the upwardly extending part of the frame, forms an acute angle with the upwardly extending part of the frame, the auxiliary wheels being operative on stairs and being normally out of contact with the ground other than on stairs.

DESCRIPTION OF PREFERRED EMBODIMENT

Figure 1:
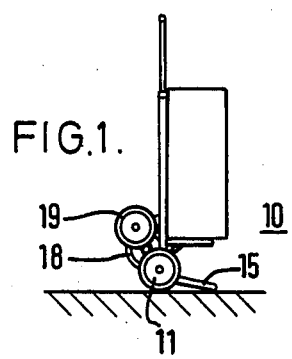
FIG. 1 shows a trolley embodying the invention, stationary.
Figure 2:
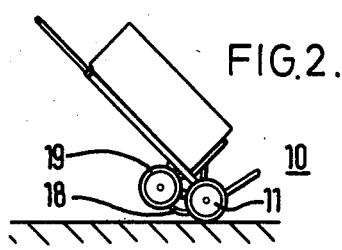
FIG. 2 shows the trolley travelling over a horizontal surface.
Figure 3:
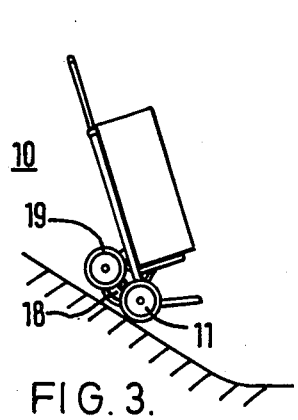
FIG. 3 shows the trolley ascending or descending a smooth incline.
Figure 4:
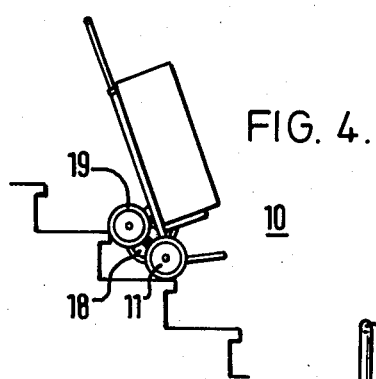
FIG. 4 shows the trolley ascending or descending stairs in accordance with the invention.
Figure 5:
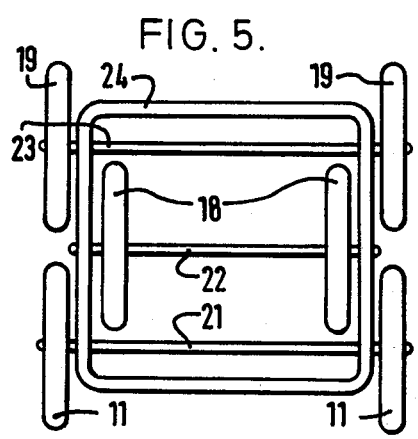
FIG. 5 is an enlarged plan view of the wheels and a sub-frame of the trolley.
Figure 6:
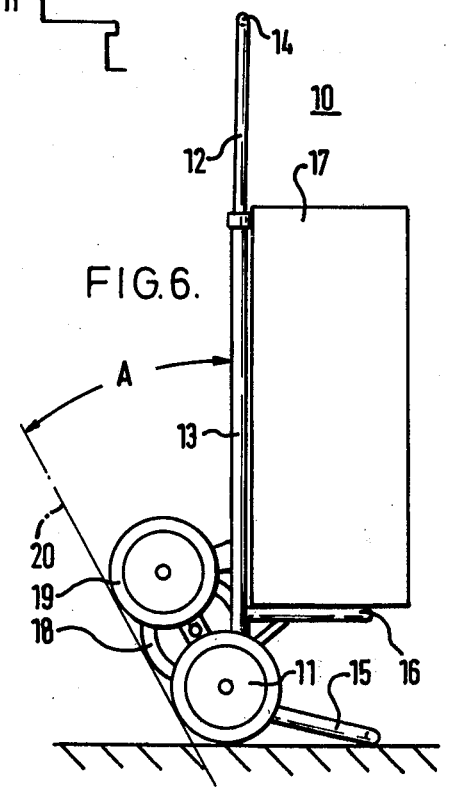
FIG. 6 is an enlarged and more detailed view corresponding to FIG. 1.

Referring to FIGS. 1 to 6, the illustrated hand trolley 10 comprises a main pair of mutually co-axial ground-engaging wheels 11 and a frame 12 to which the wheels 11 are mounted. The frame 12 comprises a back part 13 extending upwardly from the wheels 11 to handles 14 at the top thereof and a bottom part 15 extending forwardly of wheels 11 from the bottom end of back part 13. This bottom part 15 rests on the ground as shown in FIGS. 1 and 6 when trolley 10 is stationary. The frame 12 also comprises an intermediate part 16 extending forwardly of wheels 11 from back part 13 above bottom part 15, to support the bottom of a shopping bag or basket 17 which is aganst back part 13. The wheels 11 are the only operative wheels so long as the trolley 10 is stationary (FIGS. 1 and 6) or travelling on flat (FIG. 2) or smooth inclined (FIG. 3) ground and the trolley 10 *as thus far described* is conventional.

Where the trolley 10 is novel is in having a first pair 18 and a second pair 19 of auxiliary wheels mounted to frame 12 as shown, wheels 18 being mutually co-axial and behind and above wheels 11, wheels 19 being mutually co-axial and behind and above wheels 18. An imaginary plane 20, which is tangential to all of the wheels 11, 18 and 19 and which is on the far side of the axes of wheels 18 and 19 from upwardly extending frame part 13, forms a fixed acute angle A of about 30° with frame part 13. This angle is small enough for the auxiliary wheels 18 and 19 to be normally inoperative, that is, out of contact with the ground, not only level ground (FIGS. 1, 2 and 6) but even on a smooth incline (FIG. 3).

As shown more clearly in FIGS. 5 and 6, the wheels 11, 18 and 19 are all of the same diameter, in the absence of any particular reason for different diameters. The axis-to-axis spacing between wheels 11 and 18 and the axis-to-axis spacing between wheels 18 and 19 are each slightly greater than the radius, but substantially less than the diameter, of each of wheels 11, 18 and 19, so that wheels 18 overlap, and thus are positioned inside of, aligned wheels 11 and 19 as shown in FIG. 5. The three pairs of wheels 11, 18 and 19 are mounted on three respective parallel axles 21, 22 and 23 to a sub-frame 24 with wheels 18 inside and wheels 11, 19 outside of the sub-frame 24 as shown in FIG. 5.

The manner of inter-connecting frame-parts 13, 15 and 16 and sub-frame 24 in fixed relationship with each other is or may be conventional in the art of trolley manufacture.

If desired, the trolley 10 may be modified (not shown) so that the angle between frame part 13 and plane 20 can be fixed at a variety of values.

As shown in FIG. 4, the rear wheels 18 and 19 come into use when the trolley 10 is made to ascend or descend stairs, giving a very smooth ride. On flat ground and smooth includes, FIGS. 1, 2, 3 and 6, only the front wheels 11 are operative, making the trolley 10 as maneuverable as a conventional trolley.

I claim:
1. A hand trolley comprising:
   a frame having a lower end and an upper end for supporting a load;
   a sub-frame fixed to said frame;
   first, second and third pairs of mutually coaxial wheels, each having substantially the same radius, said first pair of wheels being rotatably mounted to said sub-frame at said lower end of said frame so as to be ground engaging;
   a handle fixed to said frame, said frame having a part extending upwardly from said first pair of wheels to said handle; and
   first, second and third respectively parallel shafts, successively spaced from each other by a distance slightly greater than said radius of each of said first, second and third pairs of wheels, each horizontally mounted to said sub-frame in a plane which extends upwardly and rearwardly to form an acute angle with said upwardly extending part of said frame, opposite ends of each of said first, second and third shafts being located at symmetrically opposite sides of said said sub-frame;
   said first, second and third pairs of wheels being respectively rotatably mounted to said opposite ends of each of said first, second and third shafts;
   said acute angle being fixed at approximately 30° so that when said hand trolley is moved along a smooth surface, said second and third pairs of wheels are normally out of contact with said surface, and are operative to support said frame when said hand trolley is ascending or descending stairs, said radius being of such a magnitude that each pair of at least two of said first, second, and third pairs of wheels simultaneously engages a different step when ascending or descending said stairs.

2. A hand trolley as in claim 1, wherein said first, second and third shafts are fixed against rotation to said sub-frame.

3. A hand trolley as in claim 1 or claim 2, wherein only three respectively parallel shafts consisting of said first, second and third parallel shafts and only three pairs of wheels consisting of said first, second and third pairs of wheels are located in said plane.

* * * * *